United States Patent [19]

Gurtler et al.

[11] 4,092,977
[45] June 6, 1978

[54] FLAT PLATE SOLAR COLLECTOR

[75] Inventors: Richard Warren Gurtler, Mesa; Robert Maxwell Handy, Phoenix; Michael Chancey Keeling, Tempe; Israel Arnold Lesk, Scottsdale, all of Ariz.

[73] Assignee: Motorola, Inc., Schaumburg, Ill.

[21] Appl. No.: 704,145

[22] Filed: Jul. 12, 1976

[51] Int. Cl.² ............................................... F24J 3/02
[52] U.S. Cl. .................................... 126/270; 126/271
[58] Field of Search ............... 126/270, 271; 237/1 A

[56] References Cited

U.S. PATENT DOCUMENTS

| | | | |
|---|---|---|---|
| 3,089,670 | 5/1963 | Johnson | 126/270 X |
| 3,399,664 | 9/1968 | Suhay | 126/271 |
| 3,953,110 | 4/1976 | Charoudi | 237/1 A |
| 4,018,211 | 4/1977 | Barr | 126/270 |
| 4,034,736 | 7/1977 | Telkes | 126/270 |

FOREIGN PATENT DOCUMENTS 822,768   10/1959   United Kingdom ................ 126/271

Primary Examiner—William F. O'Dea
Assistant Examiner—Larry Jones
Attorney, Agent, or Firm—John A. Fisher

[57] ABSTRACT

A modular flat plate solar collector for fluid such as air or water includes a plurality of stacked, separable solar collector elements or sub-assemblies. Removable fastening members maintain the sub-assemblies in intimate contact with each other during operation and permit access and replacement of the sub-assemblies for repair purposes. This modular approach provides a reliable, low-cost and structurally strong unit. The use of a flow channel plate having passages with aspect ratios substantially in the range of 20 or greater further improves the performance and efficiency of the collector.

8 Claims, 4 Drawing Figures

FLAT PLATE SOLAR COLLECTOR

BACKGROUND OF THE INVENTION

It is an object of the present invention to provide a modular high performance, low-cost and structurally strong collector which can be inexpensively and readily repaired. Another object of the present invention is to provide a high performance collector having improved efficiency coupled with high reliability as a result of the employment of a low-cost plastic flow channel plate.

SUMMARY OF THE INVENTION

In accordance with the aforementioned objects the present invention provides a modular flat plate solar collector having a top cover selectively coated for transmitting maximum solar radiation. A plurality of stacked, separate low-cost solar collector elements are maintained by fastening members in intimate contact with each other and with the top plate during operation thus providing a stacked, structurally strong unit. Removal of the fastening members permits inexpensive parts replacement. The performance of this modular flat plate solar collector is further improved by employing a flow channel plate having passages with an aspect ratio substantially in the range of 20 or greater.

DESCRIPTION OF THE PREFERRED EMBODIMENT

Figure 1:
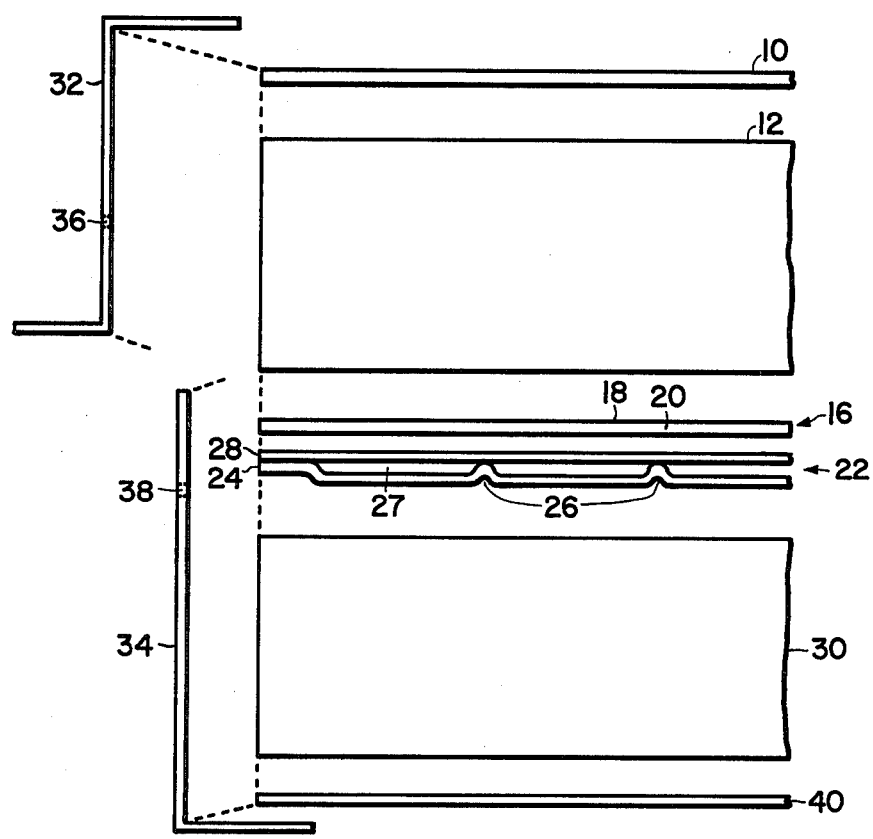
FIG. 1 illustrates an exploded view in partial cross-section showing the modular configuration of the solar collector of the present invention.
Figure 2:
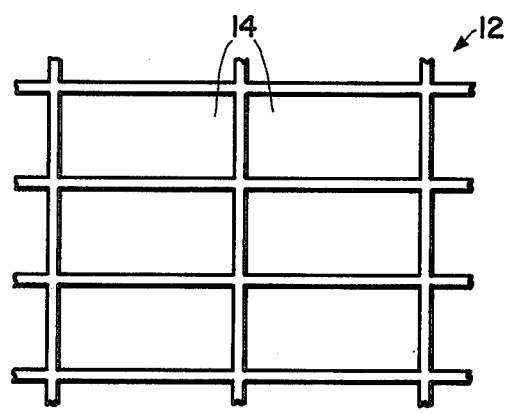
FIG. 2 shows a partially broken away view of the convection suppressor employed in the present invention.

Now referring to FIG. 1, it illustrates a collector unit having a transparent glass cover 10 approximately ⅛ inch thick which is treated with an anti-reflective material in order to transmit the maximum amount of solar radiation and filter out ultra-violet radiation. The ultra-violet radiation tends to degrade many of the plastic type components employed in present low-cost collector units. A convection suppressor having a height of about 2 inches, generally shown at 12 and in greater detail in FIG. 2, is formed of a thin walled plastic material, approximately 0.005 inches thick, and operates to minimize radiation losses due to convection and conduction. The suppressor 12 contains a plurality of separate compartments 14 whose length and width dimensions in the preferred embodiment may vary anywhere between 1 and ½ inches so as to form either rectangular or square enclosures. Other shapes for the compartments, e.g., circular or multisided, are also suitable. The compartments 14 interrupt convection currents and they also trap air to form stagnant air pockets which act as insulators to minimize thermal losses.

An absorber sub-assembly or unit 16 is formed by depositing a thin, e.g., of the order of one micron, black chrome layer 18 on a thin, e.g., one to five mil aluminum foil layer 20. This structure results in an absorber having a solar absorbtivity figure of 0.95 or higher, and conversely an infra-red emissivity radiation loss figure of 0.05 or less.

A channel fluid flow plate 22 is formed by joining two thin plastic sheets each 25–100 mils thick. A lower plastic sheet 24 can be formed or contoured by using a thermal plastic material and vacuum or thermal molding techniques to form a plurality of corrugations or bumps 26 in order to define a plurality of passages 27. Ultrasonic or adhesive bonding techniques can then be employed to join the lower sheet 24 to an upper sheet 28. If thermal setting plastic sheets are used then the corrugations or bumps 26 are joined to the upper sheet by an adhesive as ultrasonic techniques are not suitable for thermal setting plastics.

The thin metal foil absorbing surface 16 is subsequently attached to the plastic flow channel plate 22 in a manner which minimizes the thermal impedance between the members. This attachment can be accomplished via known bonding techniques (e.g., adhesive bonding).

A low density solid block 30, such as plastic foam, two to 3 inches thick, provides insulation at the back of the plastic channel flow plate 22. The insulator 30 not only prevents heat losses but adds structural integrity and support to the overall unit.

When assembled, outer support member 32 and inner support member 34, having appropriately positioned fastening holes 36 and 38, are interlocked by screws (not shown) to engage the side of the collector elements, the transparent top cover 10, and a thin metal or plastic back cover 40 in order to maintain the collector elements in stacked and intimate contact with each other as represented by the dotted lines. It can be seen that this modular approach allows the collector unit to be readily assembled or disassembled for repair. Moreover, since each of the collector elements is separable, replacement costs are kept to a minimum. Only one half of the collector is shown for simplicity, and in the preferred embodiment a single panel is one by two meters in size. This unit is readily mounted on existing structures without requiring special reinforcing as it is extremely light, approximately 5 pounds per square foot for the materials described.

Figure 3:
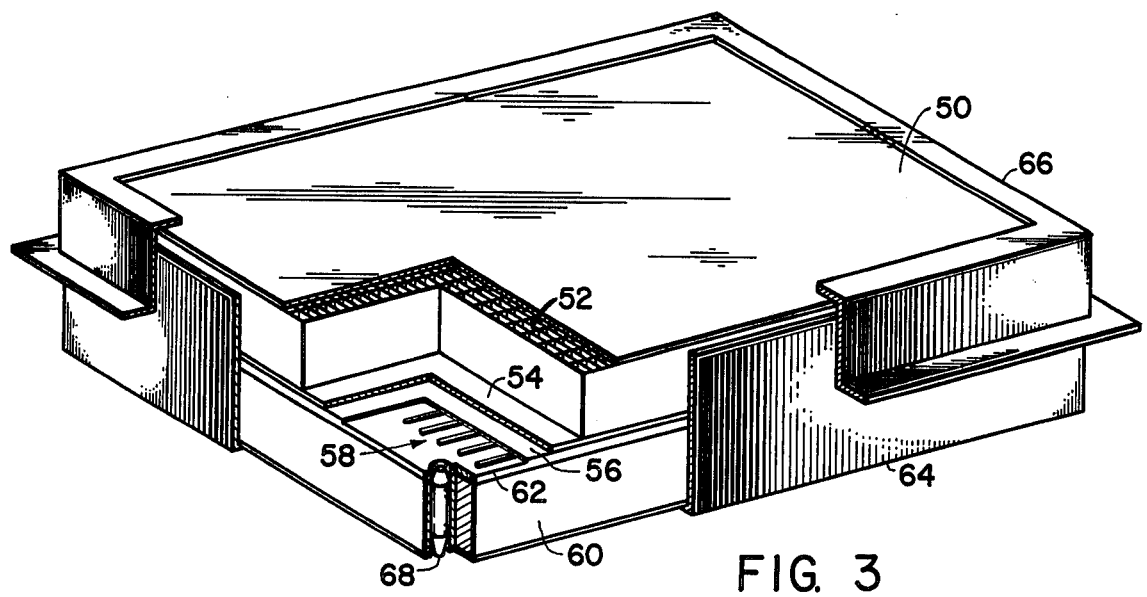
FIG. 3 is a perspective view, partially broken away, illustrating an assembled solar collector of the present invention.

FIG. 3 illustrates an assembled collector unit and includes a transparent cover 50, convection suppressor 52, absorber plate 54, a partially broken away flow plate 56 to show a plurality of fluid passages generally shown at 58, and a low density insulating foam insulator block 60. These collector elements are supported by base plate 62 and held in stacked intimate relationship by interior and exterior mounting flanges 64 and 66, respectively. The fasteners for members 64 and 66 are not shown in this depiction.

Improved efficiency of this collector is obtained by the combination of the cited, or described, collector elements, minimizing the conductive losses within the flow channel plate 22, as best illustrated in FIG. 1. This is accomplished by minimizing the internal sidewall area within each of the channels 27 thus decreasing sidewall conduction losses. More of the radiation received by the absorber plate is available to heat the fluid within the individual passages 27. Fluid, such as water in the preferred embodiment is conveyed under pressure to the fluid passages 58 via inlet fitting 68.

Figure 4:
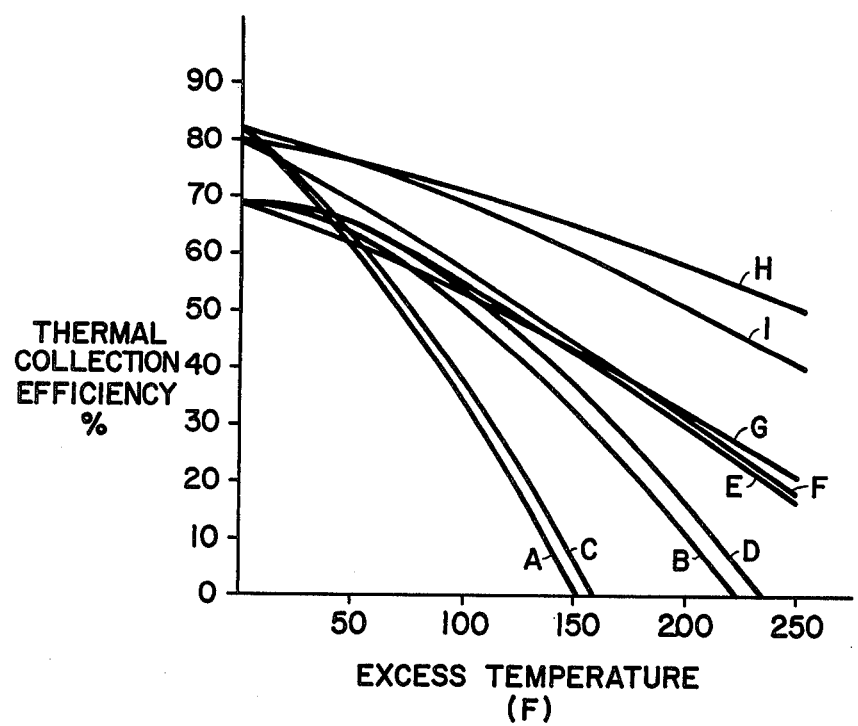
FIG. 4 depicts performance curves illustrating the improved efficiency of the present solar collector employing the flow channel plate of the present invention compared against other collector configurations.

In the preferred embodiment each of the channels depicted in FIG. 1 is one inch wide and 0.05 inches in height. Thus the aspect ratio, i.e., width over height is at least 20. Higher aspect ratio can be obtained within manufacturing and fluid frictional limitations so as to further reduce sidewall conduction and increase overall efficiency of the solar collector. Curve I in FIG. 4 illustrates the improved performance of the solar collector of the present invention compared against other solar collectors where the letter designation (A-I) for each curve coincides with the letter designation associated with the collector configurations characterized in the following chart.

| | COLLECTOR CONFIGURATION | NUMBER OF GLAZING LAYERS | ABSORBER PLATE | |
|---|---|---|---|---|
| | | | ABSORPTANCE | EMITTANCE |
| A. | Flat Black | 1 | .93 | .93 |
| B. | Flat Black | 2 | .93 | .93 |
| C. | Flat Black W/Soft Vacuum | 1 | .93 | .93 |
| D. | Flat Black W/Soft Vacuum | 2 | .93 | .93 |
| E. | Selective | 2 | .9 | .1 |
| F. | Selective W/Soft Vacuum | 1 | .9 | .1 |
| G. | Selective W/Soft Vacuum | 2 | .9 | .1 |
| H. | Selective W/High Vacuum | 1 | .9 | .1 |
| I. | High Convection Suppressant Anti-Reflection Treatment | 1 | .5 | .05 |

It is noted that the present invention collector is more efficient than all of the other collector configurations therein represented with the exception of the selective high vacuum collector configuration. Of course this latter collector configuration is much more expensive than the collector configuration of the present invention.

What is claimed is:

1. An efficient solar collector, comprising: a thin base; insulating means placed on top of the thin base; a fluid flow plate having a plurality of passages for conducting a fluid to be heated by the solar collector, the fluid flow plate being on top of the insulating means; an absorber having a layer of black chrome deposited over a layer of a metal foil, the absorber being bonded to the top of the fluid flow plate; a convection suppressor placed on top of the absorber for reducing heat losses from the absorber; a transparent cover for allowing solar radiation to pass placed on top of the convection suppressor; means to form a frame around the outer periphery of the thin base, insulating means, fluid flow plate, absorber, convection suppressor, and transparent cover all in a stacked relationship, the means to form a frame being easily removable from the stacked elements thereby providing a solar collector that is lightweight, efficient, and easily assembled and disassembled.

2. A modular solar collector that is lightweight, highly efficient and can easily be assembled and disassembled, comprising: a transparent cover for allowing solar radiation to pass, the transparent cover being treated with an anti-reflective material; a convection suppressor having a plurality of separate compartments for minimizing convection losses, the convection suppressor being placed adjacent the transparent cover; an absorber for absorbing solar radiation, the absorber having a black chrome layer over an aluminum foil layer, the absorber being adjacent to the convection suppressor; a plastic channel flow plate having a plurality of passages for fluid, the channel flow plate being in intimate contact with the absorber; insulation being adjacent the channel flow plate for minimizing heat losses from the channel flow plate; a first angled member having a first and a second leg, the first leg positioned beneath the insulation and the second leg extending upward toward the transparent cover on the outside of all elements below the transparent cover; a second angled member having a vertical portion adjacent the second leg of the first angled member and a first portion at right angle to the vertical portion and extending a short distance over the transparent cover; and means to secure the first and second angled members together to form a holding frame for all elements of the solar collector.

3. A solar collector comprising: a top member of glass or plastic having an anti-reflective coating disposed thereon; a plurality of stacked, separable elements including a flow channel plate having a plurality of interconnected passages, a convection suppression member and a metal absorber member having a selectively absorbing layer formed thereover interposed between said top member and said flow channel plate said metal absorber member being positioned in intimate contact with said flow channel plate for eliminating thermal impedance at the interface therebetween, and a solid insulating member disposed on the other side of said flow channel plate; and means for maintaining said elements in intimate contact with each other and with said top plate during operation and said means for maintaining being removable for accessing and replacing any desired one of said elements.

4. A modular solar collector as in claim 3 wherein: said convection suppressor member and insulating member are plastic.

5. A modular solar collector as in claim 3 wherein: said insulating member comprises a block of foamed material for minimizing heat losses and for providing structural integrity to the solar collector.

6. A modular solar collector as in claim 5 wherein: said solar collector weighs approximately 3–5 pounds per square foot of surface area.

7. A solar collector as in claim 3 wherein said selectively absorbing layer is a thin layer of black chrome.

8. A solar collector as in claim 3 wherein said flow channel plate is formed of a plastic material.

* * * * *